United States Patent Office 3,047,414
Patented July 31, 1962

3,047,414
ASPHALT COMPOSITIONS AND WETTING AND ANTI-STRIPPING AGENTS FOR USE IN CONNECTION THEREWITH
Jacob Katz, Providence, R.I.
(% Universal Chem. Corp., Lonsdale, R.I.)
No Drawing. Filed Aug. 28, 1957, Ser. No. 680,656
8 Claims. (Cl. 106—273)

The present invention relates to asphalt compositions and additives therefor.

The present invention is particularly directed to asphalt compositions and asphalt emulsion compositions and is also directed to novel wetting and anti-stripping agents for use in such compositions.

An object of the present invention is to provide a new class of wetting and anti-stripping agents for use in bituminous paving materials and particularly in connection with asphalts, asphalt emulsions and tars, which will assure adherence of these asphalt or tarry materials to various types of aggregates.

Another object is to provide novel asphalt and bituminous combinations which will coat and adhere to wet or dry aggregates, whether of granite or other siliceous nature and regardless of their acid or basic surface qualities and which will provide a durable long lasting adhesive bond without special processing and with the use of minimum quantities of the additive anti-stripping or wetting agent.

A further object is to provide bituminous asphalt or tarry compositions for adherence to aggregate which will not be subject to decomposition or loss of wetting and antistripping properties with prolonged heating or when subject to elevated temperatures ranging from 250° to 400° F. and which will have undiminished high wetting and anti-stripping properties over long periods of time.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has now been found that unusually effective wetting and anti-stripping agents which are stable over long periods of time and at elevated temperatures of 250° to 400° F., may be prepared by the reaction of nitrogenous polyamino aliphatic compounds in combination with fatty acids.

The important nitrogenous compounds are those which have a predetermined ratio of tertiary and amide forming nitrogen atoms preferably in a straight or branch chain with there being at least 2 tertiary salt forming nitrogen atoms in the chain and preferably adjacent at then end of the chain, whether it be straight or branched to every 1 or 2 amide forming nitrogen atoms in the chain desirably removed from the ends of the chain.

It has been found that the nitrogen atoms should be separated from each other by alkylene groups with preferably 1 to 6 alkylene groups being positioned between the amide forming nitrogen and the salt forming nitrogen.

The preferred type of compound has the following general formula:

$$(R)_2N(CH_2)_n \cdot NH \cdot (CH_2)_n N(R)_2$$

where R is an alkyl group having 1 to 4 carbon atoms and $n$ is 1 to 6.

Desirably this basic compound is then reacted with 2 or 4 mols of a fatty acid having 8 to 22 carbon atoms to amidize the central secondary nitrogen group and to form fatty acid salts with one or both of the terminal tertiary nitrogen groups.

The preferred additive compound has the formula

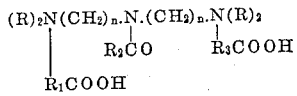

where R is an alkyl group having 1 to 4 carbons, $n$ is an integer from 1 to 6 and $R_1$, $R_2$ and $R_3$ are tall oil fatty acid groups.

It has been found that these fatty acid compounds of the above basic materials are highly soluble in asphalt and asphalt solvents and have high heat stability and will give unusual wetting and anti-stripping properties.

These effects appear to be due to polyamino aliphatic compounds with an intermediate secondary or amide forming nitrogen group and the terminal salt or soap forming nitrogen groups.

The intermediate secondary nitrogen group may be closer to one end of the chain or the other but it is important that the ratio of tertiary to amide forming nitrogen groups be at least 1 to 1 or 2 to 1.

The preferred compound that may be used is the bis-dimethylaminopropyl amine combined fatty acid amide and fatty acid salt.

It has been found that the end alkyl groups may be methyl, ethyl, propyl or butyl while the fatty acid groups may be stearic, palmitic, oleic or ricinoleic, or the fatty acids derived from tall oil, soya oil, tallow or rosin or even naphthenic acid, sebacic acid and/or dimerized acid compositions.

The basic compounds are generally derived by combining dialkylamines with acrylo-nitrile followed by hydrogenation. From ¼% to 2% of these compounds have been found to have unusually high wetting anti-stripping and bonding qualities with widely varying aggregates with varying surface acidities or basicities and they may be added directly to the asphalt compositions or emulsions without diluents and they are highly compatible.

They have unusual penetrant properties and appear to form a lasting bond between surfaces of a wide variety of aggregates and the asphalt tar or the other bituminous material.

In preparing the above compounds for addition to the bituminous asphalt or tar compositions, various polyamines may be utilized, such as bis-dimethylaminopropyl amine, bis-diethylaminopropyl amine, bis-dipropylaminopropyl amine and bis-dibutylaminopropyl amine and in general amino compounds giving rise to a final polyamino compound with a ratio of 1 to 1 or 2 to 1 tertiary salt forming nitrogen groups to secondary amide forming nitrogen groups.

The compounds may be prepared according to the following equations, where R may be hydrogen, alkyl or bound in a heterocyclic ring system.

$$R_2NH + CH_2 = CHCN \rightarrow R_2NCH_2CH_2CN \quad (I)$$

$$2R_2NH + ClCH_2CH_2CH_2CN \rightarrow$$
$$R_2NCH_2CH_2CH_2CN + R_2NH \cdot HCl \quad (II)$$

$$R_2N(CH_2)_n CN + 2H_2 \rightarrow R_2N(CH_2)_{n+1}NH_2$$
$$\text{and } [R_2N(CH_2)_{n+1}]_2NH + NH_3 \quad (IV)$$

The preferred composition is:

$$(CH_3)_2N(CH_2)_3NH(CH_2)_3N(CH_3)_2$$

with each of the nitrogen groups combined with a mol of tall fatty acid.

Example 1

One mol of bis-dimethylaminopropyl amine and two mols of tall oil fatty acids containing approximately 30% rosin acids are reacted in a one litre three neck flask equipped with an agitator, water collecting trap and thermometer.

The mixture is heated to 150° C. at which temperature reaction starts with the elimination of water. The temperature is gradually raised to 200° C. over a period of two hours and 18 milliliters of water has collected in the water trap and the reaction is completed.

The resulting product is a yellow viscous liquid completely soluble in asphalt, tar and petroleum oils.

This reaction product was incorporated in 85-100 penetration asphalt in an amount of 0.5% of the asphalt and then subjected to the heat stability test of the State of Massachusetts "Specification for Anti-Stripping Additive," March 1955. It passed the test with a 96% rating.

Example 2

One mol of bis-dimethylaminopropyl amine and three mols of fatty acids consisting of a mixture of crude tall oil, fatty acid still bottoms and naphthenic acid were reacted in a two liter three neck flask. The reaction was completed upon the elimination of one mol of water and the black semi-solid product was cut with No. 2 fuel oil to an 80% active matter concentration.

When this finished product was added to MC-3 cut back asphalt in the concentration of ½% on the weight of the MC-3 asphalt, the resulting asphalt mixture had excellent wetting and anti-stripping properties and passed the Ohio State Department of Highways Supplemental Specification Test M-205.1 with a 95% rating.

Example 3

Two mols of bis-dipropylaminopropyl amine was reacted with one mol of isosebacic acid. When the reaction is completed, three mols of commercial tall oil containing 30% rosin acids are added to neutralize three of the four available tertiary amine groups. The product is a brown viscous liquid and has excellent wetting and anti-stripping properties.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A method of enhancing the bonding, wetting and anti-stripping properties of asphalt, tar and bituminous compositions on aggregates for road building which comprises adding thereto about ¼ to 2% of an additive of the formula:

$$(R)_2N(CH_2)_n.N.(CH_2)_n.N(R)_2$$
$$R_2CO \quad R_3COOH$$
$$R_1COOH$$

where R is a low alkyl group and $R_1$, $R_2$ and $R_3$ are tall oil fatty groups, said low alkyl group having 1 to 4 carbon atoms and $n$ being an integer ranging from 1 to 6.

2. A method of enhancing the bonding, wetting and anti-stripping properties of asphalt, tar and bituminous compositions on aggregates for road building which comprises adding thereto about ¼ to 2% of an additive consisting of tall oil fatty compound of bis-dimethylaminopropyl amine, one mol of the amine being combined with three mols of tall oil fatty acid, the tertiary amine groups forming salts and the secondary amine group forming an amide with the tall oil fatty acid.

3. A method of enhancing the bonding, wetting and anti-stripping properties of hot asphalt at temperatures of 250° F. to 400° F. upon a basic aggregate of the nature of Kentucky tyrone which comprises adding to the asphalt ¼ to 2% of a compound of three mols of high molecular weight fatty acids with one mol of bis-dialkyl amino alkyl amine having at least two terminal tertiary alkyl amine groups and at least one intermediate secondary alkyl amine group, the fatty acid being combined in the form of a salt with each of the terminal tertiary groups and being combined in the form of an amide with the intermediate secondary group wherein the alkyl group has from 1 to 4 carbon atoms and the high molecular weight fatty acid contains from 8 to 22 carbon atoms.

4. The method of claim 3, said fatty acids consisting of 3 mols of tall oil fatty acids containing 30% rosin acids.

5. The method of claim 3, said fatty acids consisting of 3 mols of crude tall oil fatty acids, still bottoms fatty acids and naphthenic acids.

6. The method of claim 3, said amine consisting of 1 mol of bisdimethyl aminopropylamine.

7. The method of claim 3, said amine consisting of 1 mol of bisdipropyl aminopropylamine.

8. The method of claim 3, said amine consisting of 1 mol of bisdiethyl aminopropylamine.

References Cited in the file of this patent

UNITED STATES PATENTS

| | | |
|---|---|---|
| 2,514,954 | Johnson et al. | July 11, 1950 |
| 2,737,509 | Jelling | Mar. 6, 1956 |

FOREIGN PATENTS

| | | |
|---|---|---|
| 130,484 | Australia | Nov. 28, 1946 |
| 529,238 | Belgium | June 15, 1954 |
| 578,694 | Great Britain | July 9, 1946 |
| 711,654 | Great Britain | July 4, 1954 |
| 755,777 | Great Britain | Aug. 29, 1956 |
| 755,848 | Great Britain | Aug. 29, 1956 |